Figure 3:
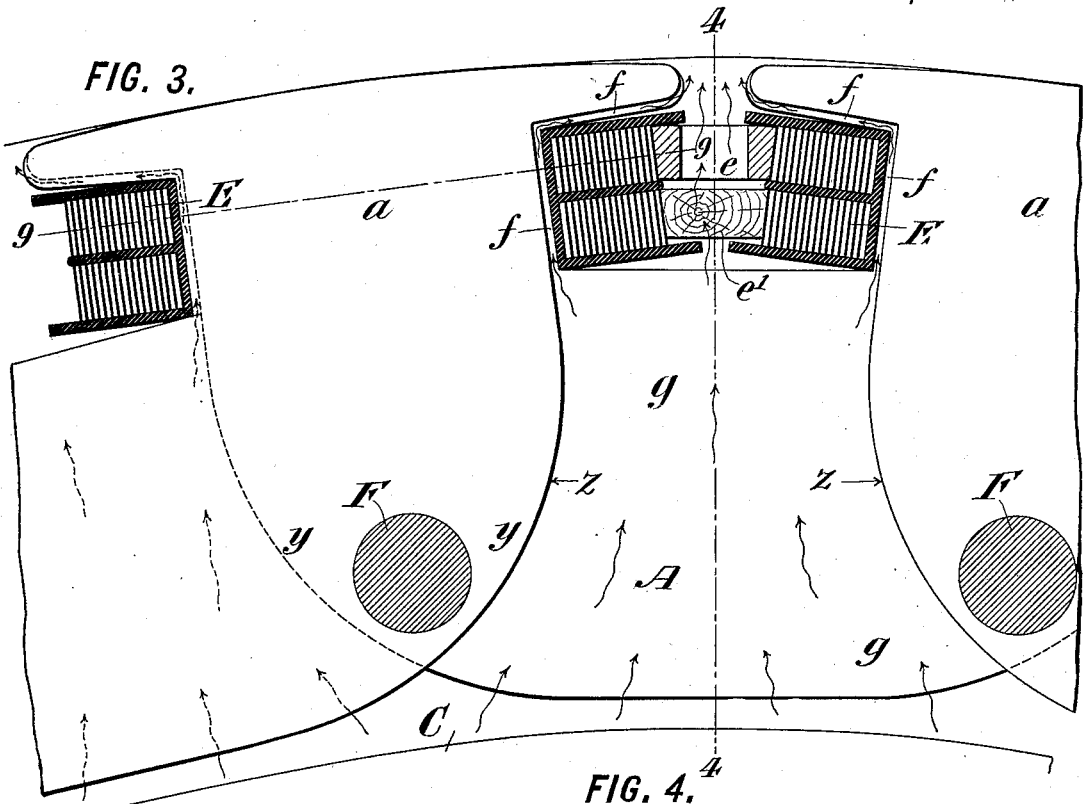

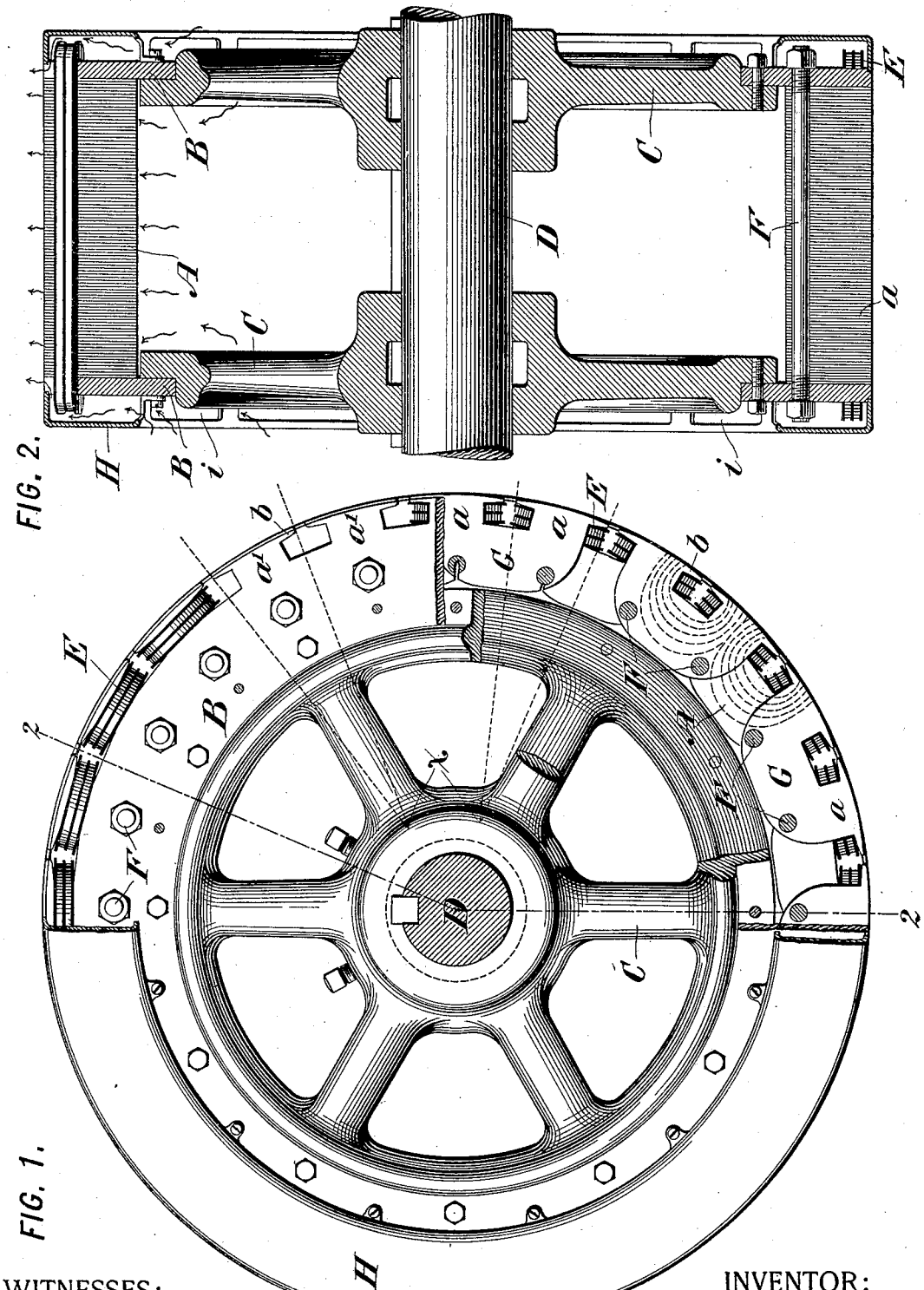

(No Model.) 6 Sheets—Sheet 2.

J. J. WOOD.
ARMATURE FOR DYNAMOS.

No. 507,194. Patented Oct. 24, 1893.

WITNESSES:
C. E. Ashley
H. W. Lloyd

INVENTOR:
James J. Wood,
By his Attorneys,
Arthur E. Draser & Co.

(No Model.) 6 Sheets—Sheet 4.
J. J. WOOD.
ARMATURE FOR DYNAMOS.

No. 507,194. Patented Oct. 24, 1893.

WITNESSES:
C. E. Ashley
H. W. Lloyd.

INVENTOR:
James J. Wood,
By his Attorneys,
Arthur C. Fraser & Co.

(No Model.)  6 Sheets—Sheet 5.
J. J. WOOD.
ARMATURE FOR DYNAMOS.
No. 507,194. Patented Oct. 24, 1893.
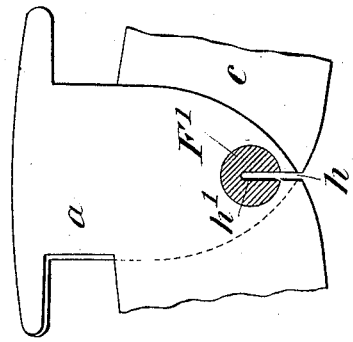
FIG. 10.
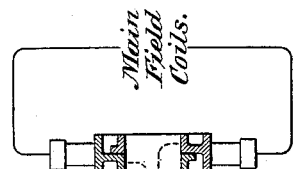
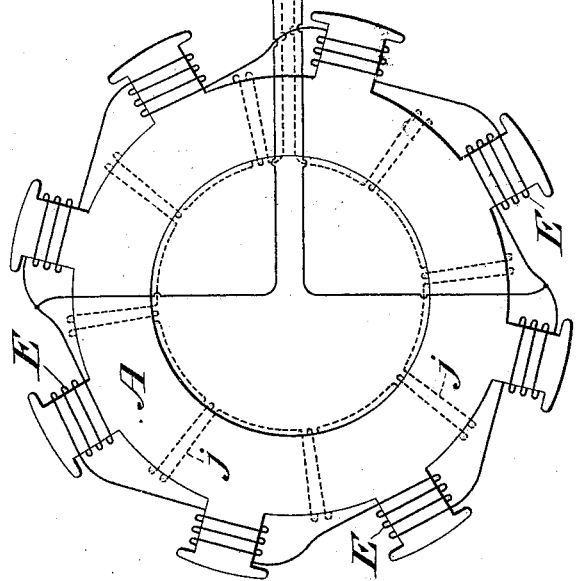
FIG. 11.
WITNESSES:
C. E. Ashley
H. W. Lloyd.
INVENTOR:
James J. Wood,
By his Attorneys,
Arthur C. Fraser & Co.

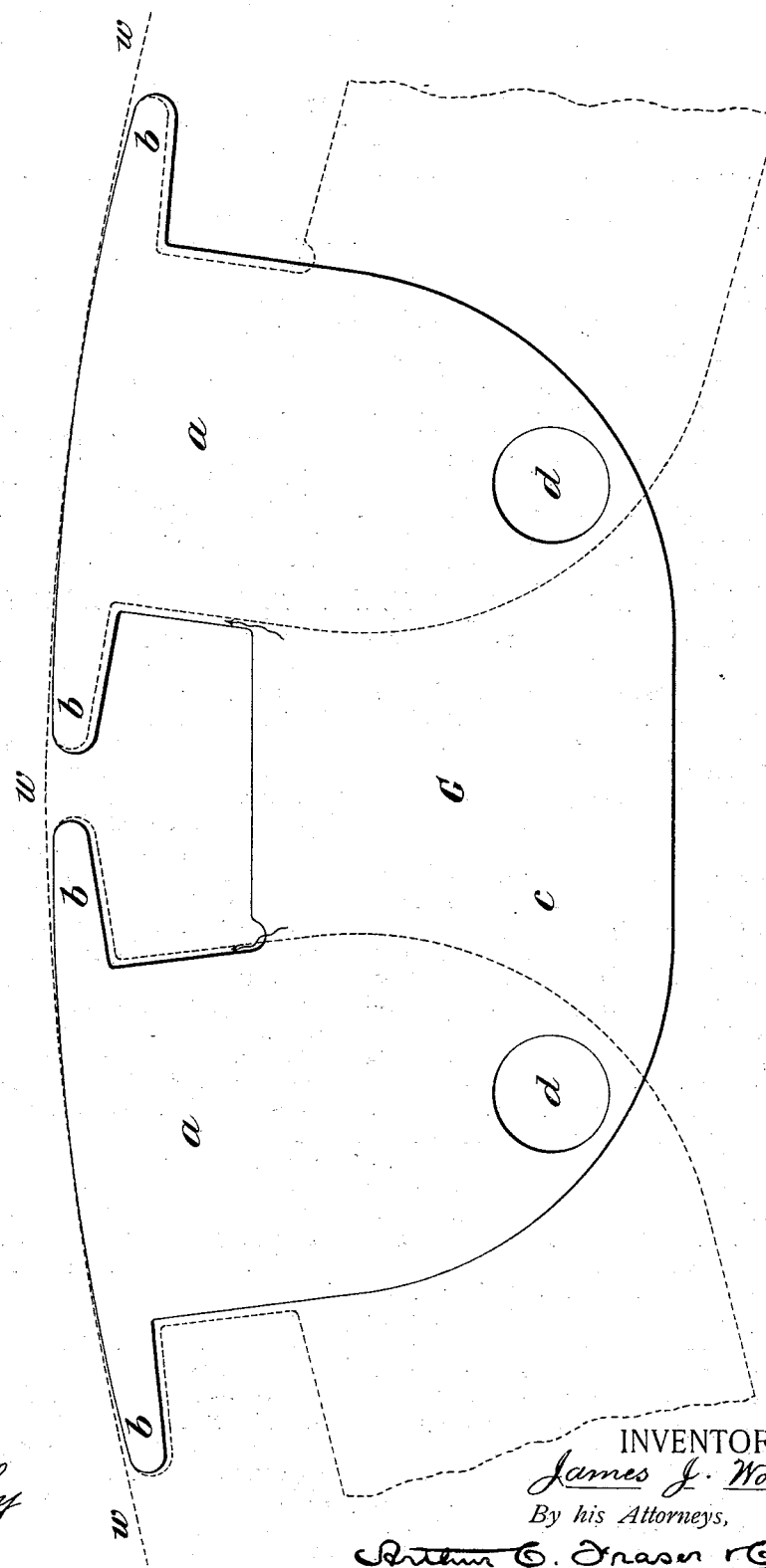

United States Patent Office.

JAMES J. WOOD, OF FORT WAYNE, INDIANA.

ARMATURE FOR DYNAMOS.

SPECIFICATION forming part of Letters Patent No. 507,194, dated October 24, 1893.

Application filed June 8, 1893. Serial No. 476,925. (No model.)

*To all whom it may concern:*

Be it known that I, JAMES J. WOOD, a citizen of the United States, residing in Fort Wayne, in the county of Allen and State of Indiana, have invented certain new and useful Improvements in Armatures for Dynamos, of which the following is a specification.

This invention relates to multipolar armatures, or those the cores of which have polar projections on their peripheries around which the coils are wound.

The invention relates particularly to so called "iron-clad" armatures employed in alternating current dynamos, or in dynamos for producing pulsatory currents of uniform direction.

The invention relates chiefly to the construction of the core of the armature, its objects being to provide a cheap and mechanically practicable construction which shall afford low magnetic resistance and contribute to the highest possible efficiency of the dynamo.

One important object of the invention is to provide for a thorough ventilation of the armature which shall be effective to keep it cool under the heating tendency due to rapid alternations of magnetism, and under full load to the carrying of a heavy current through the armature coils.

According to my invention the laminated armature core is built up of small sections or punchings of sheet iron which are alternated (singly or in groups) in such way as to make the polar projections of solid iron, and the intervening annular portions of the armature of alternated iron plates and air spaces for affording channels for an outward circulation of air through the armature core and between the coils. Those portions of the sheet iron sections or punchings which form the polar projections, are relatively so shaped or arranged that their edges instead of coinciding as heretofore, are somewhat out of coincidence so as to form grooves or channels extending outwardly along the polar projections, and along the under sides or edges of the overhanging heads thereof, thereby constituting ducts or channels for the circulation of air along the sides of the polar projections, and between the latter and the coils which are wound upon them. The sheet iron punchings are approximately of U-form, their legs constituting the polar projections and their intervening portions constituting the annular body of the core. The punchings have holes formed through them in positions as remote as possible from the lines of magnetic force, which in operation stream through the core, and the segments of the core are held together by bolts passing through the coinciding holes of the superposed lamina, non-magnetic rings being applied to opposite sides of the core and engaged by the bolts.

Figure 4:
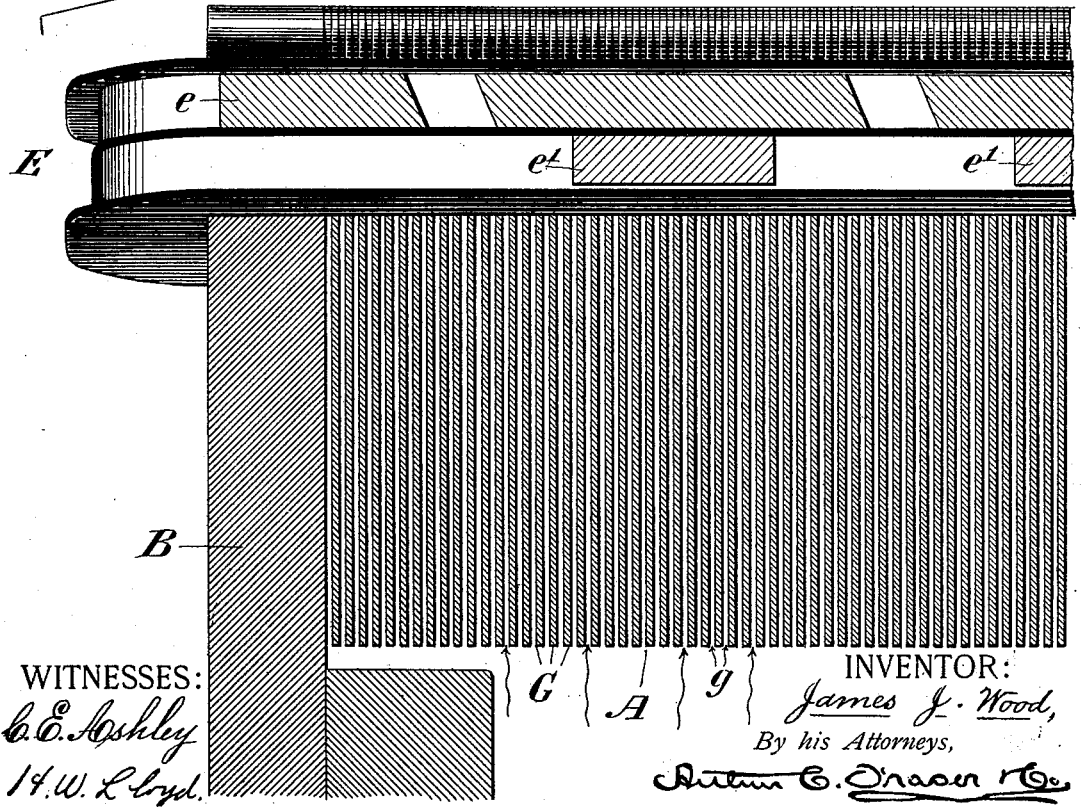
Figure 5:
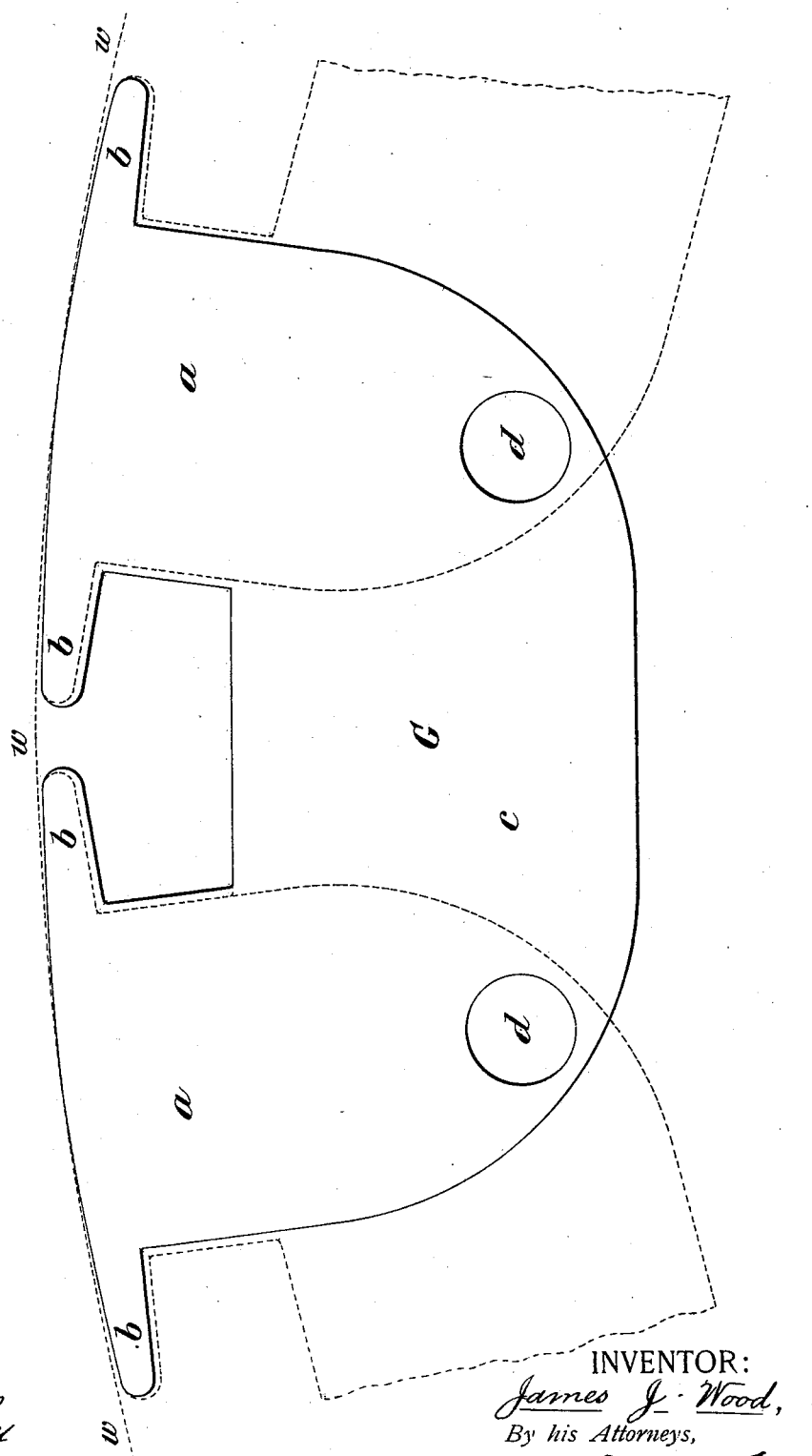
Figure 6:
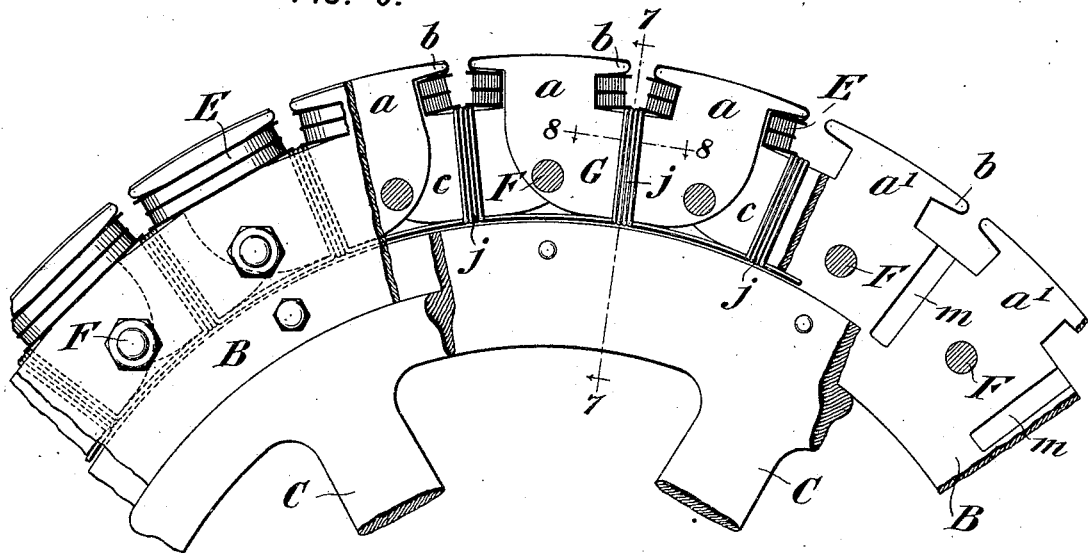
Figure 7:
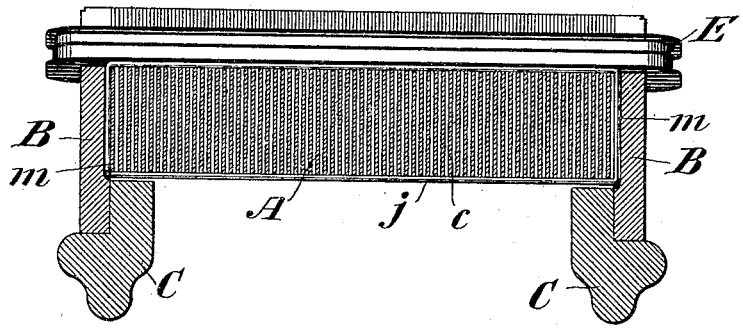
Figure 8:
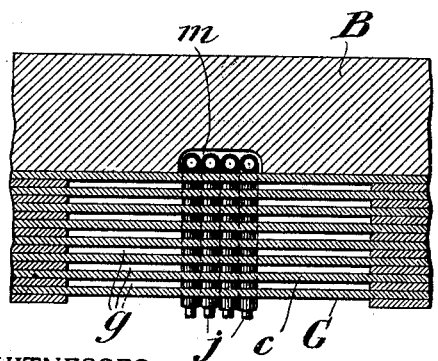
Figure 9:
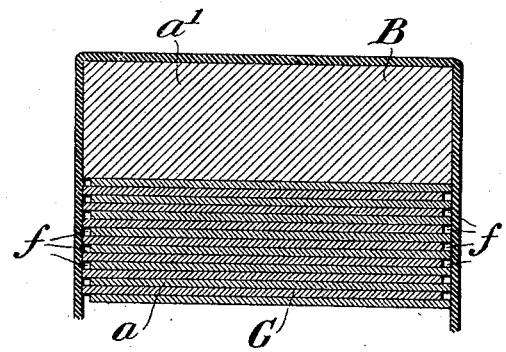

Figure 1 is a side or end elevation of my improved armature partly broken away or dissected to show the construction. Fig. 2 is a cross-section thereof on two different radial planes, as shown by the lines 2—2 in Fig. 1. Figs. 3 and 4 are fragmentary sectional views on a larger scale showing the details of construction, Fig. 3 being in a plane corresponding to the right-hand portion of Fig. 1, and Fig. 4 corresponding to the upper left-hand portion of Fig. 2. Fig. 5 is an outline view on the same scale of one of the punchings with the portions of the two adjacent punchings shown in dotted lines. Fig. 6 is a fragmentary view of the armature partially dissected to show the application of the winding for self-exciting the field. Fig. 7 is a transverse section cut on the line 7—7 in Fig. 6. Fig. 8 is a fragmentary section on a larger scale cut in the plane of the line 8—8 in Fig. 6. Fig. 9 is a fragmentary transverse section through one of the pole pieces in the plane of the line 9—9 in Fig. 3, and on the same scale as Figs. 3, 4 and 5. Fig. 10 is a fragmentary section showing a detail of Fig. 3. Fig. 11 is a diagram illustrating the circuits or windings of the armature. Fig. 12 is a large scale view similar to Fig. 5, but showing a modified shape of sheet iron punchings.

Let A designate the laminated iron core of the armature, which is mounted or supported between brass or other non-magnetic rings B B at its opposite sides, these rings in turn being supported on spiders C C, the hubs of which are fixed on the armature shaft D. For small armatures I make the spider C of brass or bronze and in one piece with the rings B, but for larger armatures I employ the construction shown in Figs. 1 and 2, making the spiders distinct from the rings, and preferably of iron because of its greater cheapness.

The armature is of the "iron-clad" type, its core A being formed with outwardly radiating polar projections $a\ a$ terminating in overhanging heads or pole pieces formed by lateral flanges $b\ b$. The armature coils E E are wound around the polar projections $a\ a$, and within the nearly inclosed spaces or cavities beneath the overhanging flanges $b\ b$. In the construction shown the armature coils are made of copper ribbon instead of wire, insulated by interposed layers of ribbon or tape of any suitable insulating material. Two such ribbon coils are wound side by side on each polar projection, being wound on a spool of insulating material and separated by an insulating partition, as clearly shown in Fig. 3. The two coils will usually be connected serially as one coil, although they may be joined in multiple, or otherwise connected according to requirements.

The multipolar armature core A is built up of great numbers of segments that are punched from sheet iron, and technically called "punchings," one of which of the preferred form is shown in detail in Fig. 5. These punchings, lettered G, are preferably of U-shape as shown in Fig. 5, each punching being formed with two legs forming the polar projections $a\ a$, and with two flanges $b\ b$ projecting from opposite sides of each leg to form the overhanging heads of the polar projections, and with an intermediate portion $c$ between the legs $a\ a$, which portion serves to constitute the annular portion or body of the core. Each punching is also formed with two holes $d\ d$ arranged preferably in line with the middle of the legs or polar projections $a\ a$, but as far therefrom as possible. In building up the laminated core, the punchings G G are alternated (singly or in groups), that is to say, a given polar projection is formed first of the left leg of one or more punchings, then of the right leg of one or more punchings, and so on. With punchings made of No. 26 sheet iron (American gage) I superpose in practice by preference three or more punchings to form a group, and alternate these groups. In building up the laminated core, the holes $d\ d$ of the superposed punchings are brought into coincidence by threading them over bolts F F (preferably of steel), which bolts extend entirely through the core and through coinciding holes in the opposite brass rings B B. By screwing nuts tightly on the ends of these bolts, the rings are drawn firmly together, and the laminæ of the core are tightly compressed and held rigidly together. It results from this construction of the laminated core, that the polar projections $a\ a$ are made solid or wholly of laminated iron, and that they continue solid until the curved lines $y\ y$ in Fig. 3 come to their intersection just below the bolt F. It also results therefrom that the space between these solid portions, namely, the space from $z$ to $z$ in Fig. 3, is only half filled with laminated iron, being formed of alternated iron plates and air spaces, as shown in section in Fig. 4. The air spaces thus formed, lettered $g\ g$, extend outwardly radially against the inner sides of the armature coils, so that when the armature is rapidly rotating, air will be caused to blow out through these spaces, as shown by the arrows in Figs. 3 and 4. The air thus circulating will escape in great part between the adjacent armature coils E E, as shown by the arrows, the space between these coils being partly filled by wooden blocks or strips designed to hold the ribbons of the coils firmly in place. In the construction shown the blocks or strips consist of a single long strip $e$ introduced between the two outer coils and having air holes formed through it at intervals, and a succession of blocks or strips $e'$ introduced at intervals between the two inner coils, so that the air can freely circulate between them.

The punchings G G are so shaped that as they are superposed by alternation in the manner described, the sides of the legs $a\ a$ and inner sides of the flanges $b\ b$ of the alternated punchings, do not coincide in outline. This want of coincidence is most clearly shown in Fig. 5, where one punching is shown in full lines and the two adjoining punchings alternated therewith are shown in dotted lines. From this figure it will be seen that the legs of the superposed punchings stand slightly out of line, so that on one side of each polar projection $a\ a$ a given punching projects beyond the adjoining ones, while on the opposite side of the polar projection the adjoining ones project beyond it. Likewise in the overhanging flanges $b\ b$ of a pole projection, a given punching on one side will project beyond the adjoining ones, and on the opposite side will project to a less distance than the adjoining ones. It results from this that channels are formed along the sides of the polar projections and flanges, as most clearly shown in the cross-section Fig. 9, where $f\ f$ designate the channels. These channels are continuous along the outer sides of the polar projections $a\ a$ and the inner sides of the flanges $b\ b$, so that they constitute air passages through which air may circulate between the polar projections and the armature coils, as clearly shown in Fig. 3, where the direction of the currents of air is shown by the arrows. While running, the centrifugal force causes a constant flow of air through these grooves or channels $f\ f$, whereby both the polar projections and the coils are constantly cooled. By employing the preferred shape of punching as shown in Fig. 5, the channels $f\ f$ communicate immediately with the channels or air spaces $g\ g$ through the body of the armature core. It will be observed that in Fig. 5 the two polar legs $a\ a$ of the punching are of like width, but have their outlines differently arranged relatively to the holes $d\ d$, by which their position is determined relative to the bolts F.

F, so that the middles of the legs of the punching are closer together than the middles of the polar projections of the core; also that the two inner flanges $b\,b$ of the punching are of the total thickness of those flanges on the finished core, while the other flanges $b\,b$ are of a less thickness than those of the core, the want of coincidence in the outline resulting from these arrangements being such as to form the air spaces $f\,f$ of the requisite depth. This improved construction of laminated armature core practically overcomes all difficulty heretofore experienced by reason of the heating of the armature in machines for effecting a heavy conversion of power, since the ventilation afforded is so effective that the air currents carry off all heat generated in the armature as rapidly as it is generated, and thereby keep the armature down while under continuous running under load to a temperature well within the limit of safety and practicability. The ventilation of the armature is effected without reducing the magnetic conductivity of the core, since all the iron needed to convey the magnetic lines is retained, being only better distributed than heretofore. The bolts F F do not require to be insulated, since they are located so near the inner margins of the punchings, and so far from the polar projections, as to be practically out of the path of the lines of magnetic force, as indicated by the lower right-hand part of Fig. 1, where the lines of force are denoted by the dotted lines. In the construction of armatures according to my invention, I have found no liability to heating of the bolts F F by reason of the generation of currents therein. I contemplate, however, in the construction of armatures of larger machines, in case any such heating should be found to result, to apply the construction shown as applied to part of the punchings in Fig. 1, and shown in detail in Fig. 10, as a means of preventing such heating. This construction, which constitutes one feature of my present invention, consists in the formation of a slot $h$ leading from the hole $d$ in the punching to the exterior thereof in direction toward the axial center or radially, so that when the punchings are built up these slots will be brought into coincidence and form deep grooves along the inner side of the armature core, which grooves shall afford so great a magnetic resistance as to intercept any stray lines of magnetic force which otherwise might project themselves around the holes $d\,d$, and which consequently might induce currents to flow in the bolts F F. For the further prevention of heating in these bolts due to the formation of eddy currents therein, I propose to form a longitudinal channel $h'$ through each bolt in the manner shown in Fig. 10, thereby so dividing it as to intercept any eddy currents, but without materially weakening the bolt. The immunity of the bolts F F from heating I attribute both to their remoteness from the denser lines of magnetic force, and to the fact that the lines of force stream to opposite sides of each bolt, thereby serving to neutralize each other.

Another feature of my invention, and one which practically is of considerable importance, is the formation of the outer faces of the polar projections of the armature core. Instead of turning off these polar projections cylindrically as heretofore so that they constitute arcs struck from the axis of rotation, the polar faces are formed with a greater curvature by being arcs of a circle of smaller radius. The difference is clearly perceptible in Fig. 5, where the dotted line $w\,w$ shows the circumference of the armature being an arc struck from the axial center in Fig. 1, whereas the polar faces are arcs struck from centers located at $x$ in Fig. 1. The precise radius of this arc may be varied considerably, but the proportion shown has been found suitable. The effect of imparting this greater curvature to the polar faces is to make the alternating electrical pulsations less sudden, so that the electro-motive force rises and falls more gradually in a curve more truly pendulous, due to the fact that the polar projections enter and leave the fixed magnetic fields less abruptly, a result which adds considerably to the efficiency of the dynamo.

In the construction shown the brass rings B B are formed with projections $a'\,a'$ of the same shape as the polar projections $a\,a$, of the core, and coincident therewith, and the armature coils E E are wound around the exterior of these projections on the rings. To conceal and protect the projecting ends of the armature coils, as well as the nuts screwed on the ends of the bolts F F, I apply to each side of the armature an annular shield or cap H of non-magnetic metal, preferably brass, by which means a smooth finish is given to the opposite ends of the armature, and which also reduces the air resistance. To further provide for ventilation, I form the inner side of this shield with air openings $i\,i$, Fig. 2, through which air may enter and may circulate past the ends of the coils, and thence pass through the space between two polar projections before escaping outwardly, as shown by the arrows in Fig. 2. The outer flange of the shield fits into a rabbet turned concentrically in the corners of the projections $a'$ of the ring B, whereby the shield is firmly seated and centered on the ring.

The armature as already described is suitable for use with alternating dynamos which are separately excited. To make the machine self-exciting, it is necessary to provide some means for taking a rectified current from the armature and causing it to traverse the fields. Usually such dynamos are compound wound, the main field coil being a shunt carrying a uniform current for imparting the initial magnetization to the field, with a supplemental series field winding carrying a rectified current taken from the armature for building up the magnetization of the field whenever the machine is under load and in proportion to the current given out by the armature. Hence to render such a machine self-exciting, it is necessary to provide the armature with a separate winding for feeding the main field exciting coils. The means provided by my invention for accomplishing this are shown in Figs. 6, 7 and 8, and in the diagram Fig. 11. Referring first to the diagram, it will be seen that the core A of the armature has in addition to the main armature winding of coils E E, an additional winding $j$, shown in dotted lines, the ends of which are carried to the opposite segments of a two-part interlocking crown commutator $k$, from the brushes of which lead wires connected to the main field exciting coils, not shown. The other connections are those commonly employed in machines of this character, and require no description.

The field exciting winding $j$ is applied to the armature by winding it around the annular or body portion $c$ of the armature core, as shown in Figs. 6 and 7. As this winding requires but a few turns of wire between each pair of polar projections, ample room is afforded for it on the inner sides of the coils E E. The winding $j$ is carried completely around the core, as shown in Fig. 7, and preferably between the core and the rings B B, a space being provided for it by coring or otherwise forming radial grooves $m$ in these rings, as shown in Figs. 6, 7 and 8. This winding is performed after the armature core is assembled, and preferably before the coils E E are applied, the wire for the winding $j$ being threaded through the grooves $m\ m$. The wire $j$ is wound first in one direction between one pair of poles, and then is carried to the next coil along one of the rings B and wound in the contrary direction around the core between the next pair, and so on, its direction of winding being reversed for each coil. The grooves $m\ m$ serve to hold the coils $j$ in position and prevent their displacement, at the same time protecting them from abrasion. Instead of winding the coils $j$ in successive spirals around the annular portion or body of the armature core, the coils may be wound around the core projections $a\ a$, in which case they should be carried around just beneath or within the coils E E.

My invention may be considerably modified in matters of detail without necessarily departing from its essential features. Those features of my invention which I consider essentially new are hereinafter defined in the claims. As an example of one modification within the scope of my invention, I would refer to Fig. 12, which shows a modified shape of core punching wherein the right-hand leg is of the full width of the polar projections of the core, while the left-hand leg is of sufficiently less width, and has its projecting flanges of sufficiently less thickness, to provide the ventilating spaces or channels. This construction, however, is obviously less desirable than that shown in Fig. 5.

I claim as my invention the following-defined novel features or improvements, each substantially as hereinbefore specified, namely:

1. A multipolar armature core in the form of a laminated ring having polar projections for receiving the coils, constructed with ventilating channels or spaces extending outwardly along the polar projections for the circulation of air between these projections and the coils.

2. A multipolar armature core in the form of a laminated ring having polar projections for receiving the coils, constructed with the polar projections built up solidly of superposed laminæ arranged out of coincidence with one another along the sides of the projections to form ventilating channels or spaces extending outwardly along the polar projections for the circulation of air between these projections and the coils.

3. A multipolar armature core in the form of a laminated ring having polar projections for receiving the coils, and heads or pole-pieces on said projections overhanging the coils, and constructed with the laminæ of said polar projections and heads arranged at intervals out of coincidence with one another at their edges on the sides of the polar projections and beneath the overhanging heads to form continuous ventilating channels extending outwardly between the polar projections and heads and the coils.

4. A multipolar armature core built up of U-shaped punchings of sheet iron with their legs superposed to form the polar projections and their intermediate portions alternated to form the body of the core with ventilating spaces through it between the punchings, and said punchings formed with projecting flanges on opposite sides of their legs to form the overhanging heads or pole-pieces.

5. A multipolar armature core built up of U-shaped punchings of sheet iron with their legs superposed to form the polar projections and their intermediate portions alternated to form the body of the core, and the alternated legs of the punchings formed of different shape so that when superposed their edges do not coincide, and thereby ventilating channels are formed along the sides of the polar projections.

6. A multipolar armature core built up of U-shaped punchings of sheet iron with their legs superposed to form the polar projections and their intermediate portions alternated to form the body of the core, with their superposed legs arranged out of coincidence along their side edges to form ventilating channels along the sides of the polar projections, and with opposite overhanging flanges on the punchings formed of different thicknesses so that when superposed they form continuations of said ventilating channels along the inner sides of the overhanging heads or pole pieces.

7. A multipolar armature core built up of U-shaped punchings of sheet iron with their legs $a\ a$ superposed to form the polar projections and their intermediate portions $c$ formed of greater width and alternated to constitute the body of the core and form ventilating spaces extending through the core between the polar portions, and bolts for binding the core together passing through holes formed in the punchings in line with the polar projections, but so remote therefrom as to avoid the path of the intense lines of force, whereby the heating of said bolts is prevented.

8. An armature consisting of a laminated iron core A, non-magnetic rings B B embracing its opposite ends, with bolts F F for drawing them together, and spiders C C fastened to and supporting said rings, and having hubs mounted on the armature shaft.

9. An armature consisting of the laminated iron core A, non-magnetic rings B B embracing it, bolts F F for drawing them together, coils E E embracing polar projections of the core, and shields H H fastened against the outer sides of said rings to inclose and conceal the projecting ends of the coils and bolts, and formed with ventilating openings $i\ i$ for permitting a circulation of air around the ends of the coils and into spaces on the periphery between the coils.

10. An iron-clad armature for a self-exciting alternating dynamo consisting of a laminated core A having polar projections $a\ a$, armature-coils E E inclosing said projections, and a field exciting winding $j$ wound as flat coils between the polar projections in the shallow spaces between the inner ends of the armature coils E E and the outer side of the annular portion of the armature core.

11. An iron-clad armature for a self-exciting alternating dynamo consisting of a laminated core A having polar projections $a\ a$, non-magnetic rings B B embracing said core and having radial grooves $m\ m$, armature coils E E inclosing said polar projections, and a field exciting winding $j$ encircling the annular core between the polar projections and passing through the grooves $m\ m$ in said rings.

In witness whereof I have hereunto signed my name in the presence of two subscribing witnesses.

JAMES J. WOOD.

Witnesses:
   CHAS. C. MILLER,
   R. F. HARDING.